June 1, 1965   R. N. ROLEY   3,186,356
DUMP VEHICLE
Filed Dec. 27, 1963   2 Sheets-Sheet 1
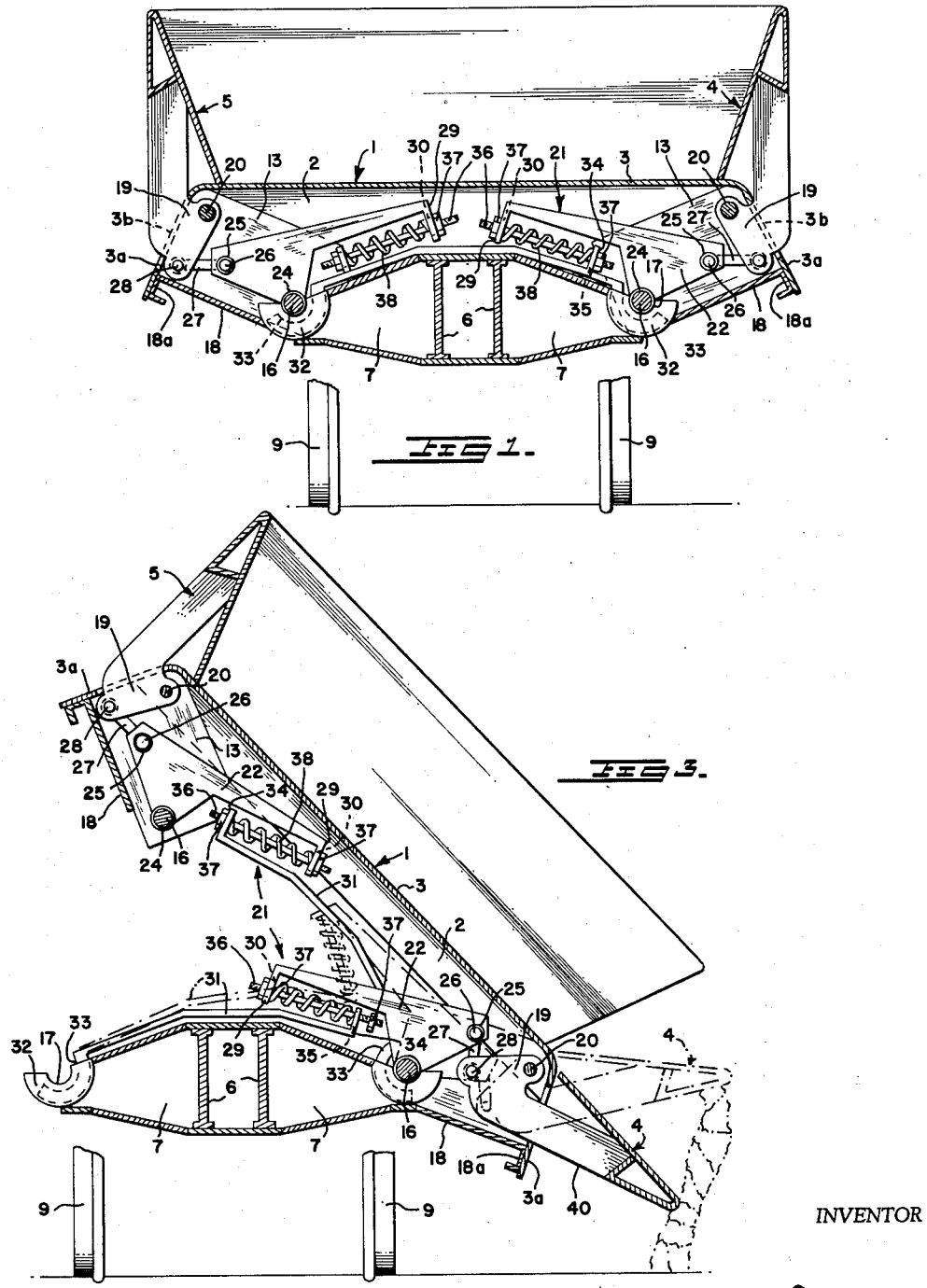
INVENTOR June 1, 1965
R. N. ROLEY
3,186,356
DUMP VEHICLE
Filed Dec. 27, 1963
2 Sheets-Sheet 2
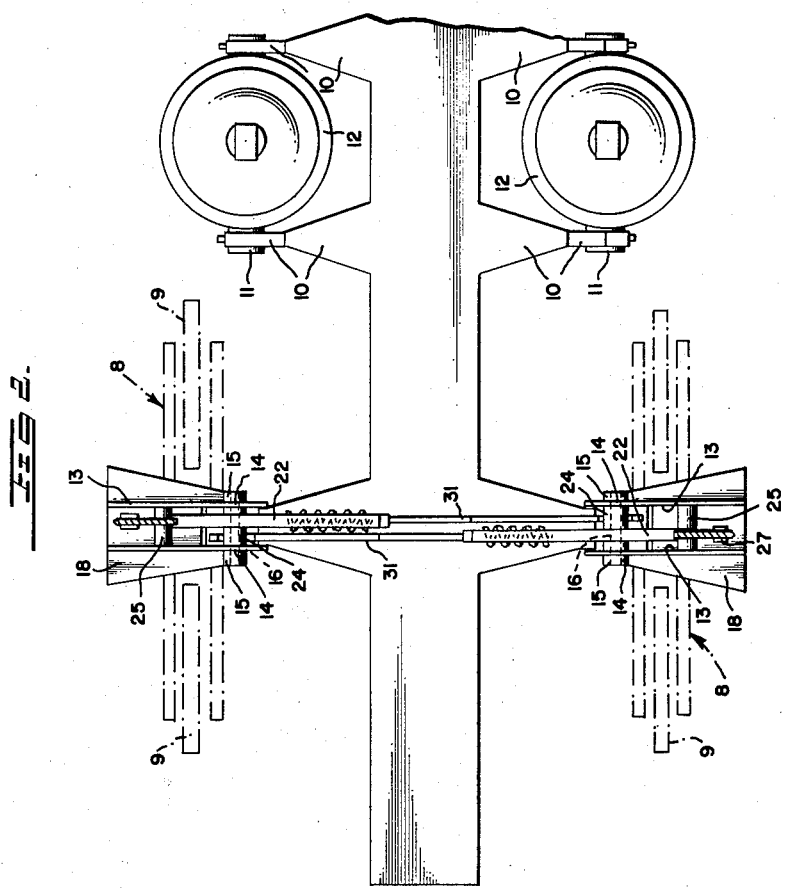
INVENTOR
BY

United States Patent Office 3,186,356
Patented June 1, 1965

3,186,356
DUMP VEHICLE
Robert Neel Roley, P.O. Box 1, Alexandria, Va.
Filed Dec. 27, 1963, Ser. No. 333,808
9 Claims. (Cl. 105—276)

The present invention relates generally to a load-carrying vehicle having a dumping feature.

More particularly, this invention pertains to door-controlling apparatus for a dump vehicle wherein a downwardly folding door is provided at each side of the vehicle body and wherein the door at the lower side is moved to an open position as the vehicle body is tilted for dumping while the door at the elevated side is maintained in a closed position.

It is a primary object of the present invention to provide controlling apparatus for the door or doors of a dump vehicle which is relatively simple in construction and reliable in operation.

Another primary object of this invention is to provide apparatus for controlling the movement of a door on a dump vehicle, which apparatus is so constituted and arranged as to move the door in response to a predetermined tilting movement of the vehicle body.

A further primary object of the present invention is the provision of such door-controlling apparatus which is so constructed that the door is moved to a fully open position before the tilting of the vehicle body is completed to effect the free flow of material from the vehicle body.

Still another primary object of this invention is to provide apparatus for controlling the movement of a door on a dump vehicle which is so constructed that if the door strikes an obstruction during the tilting of the vehicle body the door can independently move toward a closed position to avoid damage thereto while the body continues its tilting movement.

A still further primary object of the present invention is to provide such door-controlling apparatus which is so constructed that the door is floatingly supported during the tilting movement of the vehicle body to further insure against damage to the door.

Other objects and important features of the present invention will be apparent from a study of the specification following taken with the drawings, which together show, illustrate, describe, and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Referring to the drawings:

FIGURE 1 is an elevational view, partly in section, of a dump vehicle and door-controlling apparatus thereof, constructed according to the principles of the present invention, with parts being broken away;

FIGURE 2 is a diagrammatic plan view of the underframe at one end of the dump vehicle and of the door-controlling apparatus thereof, with parts being broken away; and FIGURE 3 is an elevational view similar to FIGURE 1, showing the vehicle body in a tilted position and the door at the lower side of the body in a fully open position.

Referring now to the illustrated embodiment of the present invention and, particularly, to FIGURE 1, there is shown a dump vehicle comprising a load-carrying body 1 having cross beams 2 on which is mounted a floor plate 3. At each end of the body 1, an end member (not shown) is rigidly mounted in any suitable manner. A pair of generally downwardly folding doors 4 and 5 are mounted on the sides of the body 1 in a manner to be described hereinafter. The floor plate 3, end members and doors 4, 5 preferably are formed of relatively heavy steel plates welded or riveted together.

The underframe on which the body 1 is mounted comprises a center sill 6 at each end thereof formed of sheet-metal plates welded together, and extending laterally therefrom are bolsters 7 preferably formed of steel plates welded together. The body 1 is mounted on the bolsters 7 so that it can be tilted selectively about fulcrums at opposite sides of the underframe, as will be apparent from the description hereinafter. The underframe of the body 1, in turn, is supported adjacent each end in any well-known or conventional manner on truck frames 8 (FIGURE 2) having supporting wheels 9 thereon which may be constructed for travel on rails or for travel on any desired roadbed construction.

As shown in FIGURE 2, projecting laterally from each of the center sills 6 are power cylinder supporting members 10 which may be constructed in any suitable manner and carry trunnion supports 11 for power cylinders 12. The power cylinders 12 are provided at each side of the underframe for the body 1 and have slidably disposed therein the usual lifting pistons (not shown) which are connected to the body 1 in any conventional manner so that the body 1 may be raised selectively at one side or the other for the dumping of the contents thereof. It is noted that the construction of the power cylinders 12 and the manner of operating and mounting these cylinders form no part of the present invention, and thus further disclosure thereof is not deemed necessary.

Adjacent the bolsters 7 at each side of the body 1 are a pair of substantially parallel body-supporting plates 13 which are preferably welded to and depend from the cross beams 2. Each of the supporting plates 13 has an aperture 14 therein and a sleeve 15 rigidly attached thereto and in alignment with the aperture 14. A fulcrum pin 16 extends through the apertures 14 of adjacent supporting plates 13 and has the ends thereof received and retained in the sleeves 15. The fulcrum pins 16, therefore, serve to support the pairs of supporting plates 13 and thus the body 1 for the pivotal or tilting movement thereof. The bolsters 7 are provided with U-shaped bearings 17 (FIGURES 1 and 3) which serve as fulcrum supports for the body 1 when it is tilted and as underframe supports for the body 1 during loading and transport.

Referring to FIGURE 1, the floor plate 3 of the body 1 is provided with a depending skirt 3a which is rigidly secured to the supporting plates 13 at each side of the body 1. A cross plate 18 is rigidly attached to each pair of supporting plates 13 and is provided with a skirt angle bar reinforcement 18a which is welded to the floor plate skirt 3a. Each of the doors 4 and 5 is provided with a hinge bracket 19 rigidly mounted thereto adjacent each of the bolsters 7. Each hinge bracket 19 is rotatably mounted on a pivot pin 20 which in turn is mounted on the adjacent cross beams 2. The floor plate skirt 3a is provided with slots 3b on each side thereof through which the hinge brackets 19 extend for mounting on the cross beams 2.

Adjacent each of the hinge brackets 19 for the doors 4 and 5 there is provided a door-controlling apparatus 21, and thus in the illustrated embodiment of the invention there are two controlling apparatus 21 for each of the doors 4, 5, i.e., one controlling apparatus 21 at each end thereof. The door-controlling apparatus 21 are substantially identical in construction and each comprises a main operating lever or arm 22 having a sleeve 24 preferably cut from steel plate and welded to the bottom portion thereof. The sleeve 24 is mounted on the U-shaped bearing 17 of the adjacent bolster 7 between the adjacent pair of supporting plates 13 and surrounds the fulcrum pin 16 extending between the plates 13 so that the pin 16 is rotatable therein. The sleeves 24, therefore, serve as fulcrum supports for the vehicle body 1, since the fulcrum pins 16 are rotatably mounted therein and the body-supporting plates 13 and sleeves 15 thereon turn on the fulcrum pins 16 when the vehicle body 1 is tilted.

The outer portion of each main operating lever 22 has a split sleeve 25 rigidly attached thereto in which a pivot pin 26 is mounted. One end of a link 27 is rotatably mounted on the pivot pin 26 while the other end of the link 27 is pivotally mounted at 28 to the adjacent door hinge bracket 19 (see FIGURE 1). The inner end portion of each main operating lever 22 is provided with a depending flange 29 having a slot 30 therein extending through substantially the entire length thereof.

Structurally operatively associated with each operating lever 22 is an auxiliary controlling arm 31 which preferably is cut from steel plate and is fixedly associated with or connected to the underframe at the opposite side of the vehicle body 1 from the operating lever 22. The adjacent bolster 7 is provided with an arcuate housing 32 adjacent the U-shaped bearing 17 thereof, and the outer end of the auxiliary arm 31 has a curved portion 33 which is disposed in the bolster housing 32 and supported for sliding of pivotal movement therein. The inner end portion of the auxiliary arm 31 is disposed beneath the inner end portion of the adjacent operating lever 22 in overlapping relationship therewith and is provided with an upstanding flange 34 having a slot 35 therein which is in substantially lateral alignment with the slot 30 in the operating lever flange 29.

As clearly shown in FIGURE 1, the depending lever flange 29 and the upstanding arm flange 34 are slidably mounted on a rod 36, preferably formed of steel and having a smooth outer surface, which extends through the slots 30 and 35, respectively, thereof. The rod 36 preferably is threaded at each end thereof and is provided with a stop fastener 37 on each of the threaded portions thereof to adjustably limit the sliding movement of the operating lever flange 29 and the auxiliary arm flange 34 thereon. A coil spring 38 or other suitable resilient means surrounds the rod 36 and is disposed between the flanges 29 and 34 to cushion movement of the flanges 29, 34 away from the stop fasteners 37, which movement would result from an upward rotation of the inner end portions of the operating lever 22 and the auxiliary arm 31 about the fulcrum pin 16 and the bolster housing 32, respectively.

It is apparent from the foregoing description of the door-controlling apparatus 21 that when the vehicle body 1 is in the normal position of FIGURE 1 for loading and transport, the doors 4 and 5 are maintained in a substantially vertical closed position. This is because the links 27, pivotally mounted on the operating levers 22 and on the door hinge brackets 19, are disposed in a substantially horizontal position (see FIGURE 1) and thus prevent rotation of the door hinge brackets 19 about their pivot pins 20.

Referring now to FIGURE 3, when the vehicle body 1 is tilted for dumping by actuation of one of the power cylinders 12, the operating lever 22 for the door 4 at the dumping side remains in a fixed position relative to the underframe. During this tilting movement the link 27 pivots on the pivot pin 26 in a generally clockwise direction and thus allows the door hinge bracket 19 to rotate on its pivot pin 20 in a clockwise direction to open the door 4. The outer edge 40 of each door hinge bracket 19 comes into contact with the adjacent cross plate 18 to limit the opening movement of the door 4 to a position wherein the inner face of the door 4 is substantially in alignment with the floor plate 3. The door-controlling apparatus 21 preferably are so constructed that the door hinge brackets 19 contact the cross plates 18 when the body 1 tilts approximately 35 degrees, although any suitable tilting angle could be utilized without departing from the scope of the instant invention.

It is noted that, after the full opening movement of the door 4 on the dumping side, the vehicle body 1 can continue its tilting movement for the reason that each operating lever 22 can rotate in a clockwise direction about the adjacent fulcrum pin 16. The advantage of fully opening the door 4 at the dumping side before the body 1 completes its tilting movement is that some of the material will slide out from the body at this point and the vehicle will be more stable when the body 1 is fully tilted to permit the free flow of material as soon as it tends to slip on the floor plate 3. When the body 1 is fully tilted, the cross plates 18 are disposed under the end of the adjacent bolsters 7 to prevent the body 1 from being lifted from its fulcrum supports in the U-shaped bearings 17.

If the door 4 at the dumping side should strike an obstruction during the tilting of the body 1, each adjacent operating lever 22 has the inner portions thereof rotated upwardly in a clockwise direction about its fulcrum pin 16 to thus allow the door 4 to move in a counterclockwise or closing direction. As shown in broken lines in FIGURE 3, this upward movement of the inner portion of the operating lever 22 results in a corresponding upward movement of the inner portion of the auxiliary arm 31, and causes the depending lever flange 29 and the upstanding arm flange 34 to move on the rod 36 towards each other and against the force of the coil spring 38. The coil spring 38, therefore, serves to provide a floating mounting for the door 4, so that when the door 4 strikes an obstruction it may move in a closing direction and its closing movement is cushioned by the spring 38 through the operating lever 22, thereby preventing possible damage to the door 4 from contact with the obstruction.

During the tilting movement of the vehicle body 1, the door 5 at the elevated side thereof is maintained in a closed position, since each operating lever 22 therefor remains in a fixed position with respect to the body 1 and the link 27 prevents movement of the hinge bracket 19 about its pivot pin 20, thereby preventing movement of the door 5. It will be seen, therefore, that unless there is relative movement between the operating levers 22 and the vehicle body 1, there will be no movement of the door associated with the levers 22.

Thus, the present dumping vehicle construction and door-controlling apparatus therefor insure that the doors will remain closed with respect to the vehicle body during the loading and transport thereof, and effect the opening of the door on the dumping side during tilting of the vehicle body while the door on the elevated side of the body is held in a closed position. Furthermore, owing to the floating mounting of the doors, damage to the door on the dumping side will be avoided if it should strike an obstruction during the tilting of the vehicle body.

While the invention has been shown, illustrated, described, and disclosed in terms of an embodiment or modification which it has assumed in practice, the scope of the invention should not be deemed to be limited by the precise embodiment or modification herein shown, illustrated, described, or disclosed, such other embodiments or modifications intended to be reserved especially as they fall within the scope of the claims here appended.

What is claimed is:

1. A dump vehicle comprising:
a load-carrying body;
said body being tiltable from a neutral position toward either side thereof;
a pair of substantially parallel body-supporting plates disposed on each side of said body and rigidly structally associated to the bottom portion thereof,
dumping doors mounted on each side of said body; each of said doors having:
a hinge bracket rigidly structurally associated therewith which extends beneath said body and is povotally movably mounted upon the adjacent pair of said supporting plates;
a body underframe comprising:
a center sill, and
bolsters extending generally laterally from said center sill and being rigidly structurally associated therewith; each of said bolsters having:
an arcuate housing rigidly structurally positioned thereupon defines at its upper surface a generally U-shaped bearing;
an operating lever for each of said doors having:
a sleeve rigidly structurally associated with the bottom portion thereof;
said sleeve being rotatably movably disposed on the U-shaped bolster bearing disposed on the same side of said vehicle body as said sleeve;
a fulcrum pin disposed within said sleeve and being rotatably movably positioned upon the adjacent pair of said supporting plates,
a link pivotally movably positioned upon and extending between one end of each of said operating levers and the adjacent door hinge bracket;
each of said links being so disposed with respect to the adjacent door hinge bracket as to maintain said dumping doors in a closed position with respect to said body when said body is in a neutral position;
the other end of each of said operating levers being provided with a depending flange having:
a slot therein;
an auxiliary arm for each of said operating levers;
said auxiliary arm having a curved portion at one end thereof which is slidably disposed in the arcuate housing of the bolster on the opposite side of said body from said first-named bolster;
the other end of said auxiliary arm being disposed below said other end of said operating lever and being provided with an upstanding flange having a slot therein generally in alignment with said lever slot,
a rod disposed between said operating lever flange and said auxiliary arm flange and extending through said lever slot and said arm slot,
an adjustable stop member positioned upon each end of said rod to limit movement of said lever flange and said arm flange with respect to said rod,
a coil spring surrounding said rod and having one end thereof in mutual co-operative engagement with said lever flange and the other end thereof in mutual co-operative engagement with said arm flange, and
means mounted on said body underframe for selectively tilting said body on said fulcrum pins toward one side thereof;
enabling the presentation, during the tilting of said body to one side thereof for dumping, of relative movement between said body and said operating levers on the dumping side; and
the links on the dumping side being disposed so as to permit rotation of the adjacent door hinge brackets pivotally structurally operatively associated therewith, enabling the opening of the door at the dumping side of said body while the links at the elevated side are so disposed as to preclude opening movement of the door at the elevated side.

2. A dump vehicle as defined in claim 1, wherein:
said body, body-supporting plates, dumping doors, underframe, operating levers, and auxiliary arms are fabricated of steel plate.

3. A dump vehicle comprising, in combination:
a load-carrying body,
means for supporting said body for tilting movement from a neutral position toward either side thereof,
dumping doors disposed on either side of said body and being pivotally movably positioned upon said supporting means,
an operating lever for each of said doors;
said operating lever being pivotally movably positioned upon said supporting means,
connecting means for pivotally structurally associating each of said operating levers and its respective door;
said connecting means being so constituted and disposed as to maintain said dumping doors in a closed position when said body is in said neutral position,
an auxiliary arm structurally operatively associated with each of said operating levers and being pivotally movably positioned upon said supporting means on the opposite side of said body from its respective operating lever,
cushioning means disposed intermediate the pivotal mountings of the auxiliary arm and each operating lever to resiliently cushion movement of one relative to the other, and
means mounted upon said supporting means for selectively tilting said body on said supporting means toward one side thereof;
enabling the presentation, during the tilting movement of said body to one side thereof, of relative movement between said body and said operating levers on the dumping side; and
said connecting means being so disposed during tilting as to enable opening movement of the door at the dumping side and to maintain the door at the elevated side of the body in a closed position.

4. A dump vehicle as defined in claim 3, wherein:
said body-supporting means comprises:
body-supporting plates disposed on each side of said body;
said body plates being rigidly structurally associated with said body-supporting means; and
a body underframe upon which said supporting plates are pivotally movably positioned; and wherein:
each of said doors has rigidly structurally associated therewith a hinge bracket which is pivotally movably positioned upon said supporting plates.

5. A dump vehicle as defined in claim 3, wherein:
said connecting means comprises:
a link pivotally movably connected to the operating lever and to the adjacent door.

6. A dump vehicle as defined in claim 3, wherein:
said operating lever comprises:
a flange having a slot, and
said auxiliary arm comprises:
a flange having a slot disposed therein in alignment with said lever slot; and
a rod is disposed between said operating lever flange and said auxiliary arm flange and extends through said lever slot and said arm slot.

7. A dump vehicle as defined in claim 6, wherein:
said cushioning means comprises:
a bias disposed in mutual co-operative engagement with said lever flange and said arm flange;
said bias serving to cushion the closing movement of the door on the dumping side if it should strike an obstruction during the tilting of said body, enabling movement of said operating lever flange and said auxiliary arm flange toward each other and against the force of said bias.

8. The dump vehicle as defined in claim 6, together with adjustable means operatively associated with the rod to limit movement of the lever flange and arm flange relative to each other.

9. The dump vehicle as defined in claim 7, wherein: said bias comprises, a coil spring surrounding the rod with one end portion of the coil spring engaging the lever flange and the other end portion thereof engaging the arm flange.

References Cited by the Examiner
UNITED STATES PATENTS

| | | | |
|---|---|---|---|
| 2,200,271 | 5/40 | Flowers | 105—276 |
| 2,826,999 | 3/58 | Flowers | 105—277 |

MILTON BUCHLER, *Primary Examiner.*